(12) United States Patent
Van Willigen

(10) Patent No.: US 6,577,847 B2
(45) Date of Patent: Jun. 10, 2003

(54) SATELLITE COMMUNICATION SYSTEM WITH MULTIPLE VARIABLE DATA RATE CARRIER

(75) Inventor: Engelbertus Van Willigen, Hilversum (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1 day.

(21) Appl. No.: 10/056,084

(22) Filed: Jan. 24, 2002

(65) Prior Publication Data

US 2002/0115408 A1 Aug. 22, 2002

(30) Foreign Application Priority Data

Jan. 29, 2001 (EP) .......................................... 01200317

(51) Int. Cl.[7] .............................................. H04B 7/185
(52) U.S. Cl. .................. 455/13.1; 455/12.1; 455/427
(58) Field of Search ..................... 455/10, 12.1, 13.1, 455/13.2, 13.3, 13.4, 68, 69, 70; 375/344

(56) References Cited

U.S. PATENT DOCUMENTS

| | | | | |
|---|---|---|---|---|
| 4,941,199 A | | 7/1990 | Saam ........................... | 455/10 |
| 5,878,329 A | * | 3/1999 | Mallinckrodt ................ | 455/69 |
| 6,070,074 A | * | 5/2000 | Perahia et al. .............. | 455/13.4 |
| 6,141,534 A | * | 10/2000 | Snell et al. ................. | 455/12.1 |
| 2003/0027568 A1 | * | 2/2003 | Berger ......................... | 455/429 |

FOREIGN PATENT DOCUMENTS

EP 0769856 A2 * 10/1996 ........... H04B/7/185

* cited by examiner

Primary Examiner—Nay Maung
(74) Attorney, Agent, or Firm—Michael E. Belk

(57) ABSTRACT

Described is a satellite communication system 1 comprising a primary station 2, a communication satellite 3 and at least one secondary station 4. The primary station 2 transmits data signals 5 via the communication satellite 3 to the secondary station 4. The primary station 2 comprises a modulator 24 for modulating the data signals onto at least two differently FEC-encoded frequency carriers. The secondary station 4 comprises a tuner 32 for tuning to one of the frequency carriers in dependence on a tuning signal received from the primary station 2. The secondary station 4 further comprising signal quality determining means for determining at least an estimate of a signal quality of the frequency carrier presently tuned to. The secondary station 4 comprising retuning request transmit means for transmitting a retuning request signal to the primary station 2 when the estimate of the signal quality becomes lower than a predetermined threshold value. The primary station 2 comprises determining means for determining a frequency carrier with a better signal quality upon reception of the retuning request signal and tuning signal transmit means for transmitting the tuning signal indicating this frequency carrier to the secondary station 4. In this way, when the data signals 5 (which are modulated onto a certain frequency carrier) are received poorly (e.g. because of rain fading) the secondary station 4 can tune to a frequency carrier with a more robust FEC-encoding and the data signals 5 can be received without problems.

12 Claims, 2 Drawing Sheets

SATELLITE COMMUNICATION SYSTEM WITH MULTIPLE VARIABLE DATA RATE CARRIER

FIELD OF THE INVENTION

The invention relates to a satellite communication system comprising a primary station, a communication satellite and at least one secondary station.

The invention further relates to a primary station for use in a satellite communication system, to a secondary station for use in a satellite communication system and to a method of transmitting data signals from a primary station via a communication satellite to a secondary station.

Such satellite communication systems may for example be used for transmission of television programs or Internet data (i.e. so-called IP packets) to a large number of secondary stations. Communications conducted by such satellite communication systems are susceptible to atmospheric conditions between the primary station (e.g. a ground station or hub)/secondary station (e.g. a satellite receiver) and the satellite. In particular, rains are known to cause attenuation of satellite communications that are for example conducted in the Ka-frequency band. This attenuation is often referred to as rain fade attenuation or rain fade or rain fading and can severely impact the availability of satellite services.

BACKGROUND OF THE INVENTION

A satellite communication system according to the preamble is known from U. S. Pat. No. 4,941,199. This United States Patent discloses two possible solutions to solve the problem of rain fading and to increase the availability of satellite services: By controlling (i.e. increasing) the transmit power (EIRP) of the satellite communication system. However, increasing the transmit power of the satellite is not always possible, because a satellite is normally power limited.

By applying a more robust forward error correction coding (FEC) scheme, resulting in a decrease of the effective data rate.

Dimensioning the system in such a way that full transponder capacity can be used even in case of heavy rain fading by applying a robust FEC scheme (having a lower effective data rate) is problematic, because this leads to a waste of bandwidth. For example, if the data rate of a carrier is decreased to increase the availability of 1% of the population in a rainy area, also the data rate for the other 99% will be decreased. This is clearly a waste of satellite bandwidth.

In addition, the received power density within the coverage zone of a spot beam of a satellite is in general not uniform. The satellite receivers (i.e. the secondary stations) situated at the center of the spot beam enjoy a higher received power density than the ones situated at the periphery of the beam. Therefore, the ones in the center can receive a higher data rate due to the higher receive power, then the ones at the periphery.

For these reasons it is desirable that the data rate can be modified dynamically (i.e. that the applied FEC scheme can be modified dynamically on a per packet basis (TDMA)). When the center population of a beam or receivers with clear sky are addressed a relatively high data rate can be used (i.e. a relatively less robust FEC scheme can be applied). When either the receivers at the periphery or the ones affected by rain fading are being addressed, the data rate can be lowered (i.e. a relatively more robust FEC scheme can be applied).

Currently available demodulators and decoders for use in satellite receivers, such as the TDA8043 Satellite Demodulator and Decoder integrated circuit of Philips Semiconductors, are not capable of handling a dynamically changing (i.e. on a per packet basis) FEC scheme in real time.

BRIEF SUMMARY OF THE INVENTION

It is an object of the invention to provide a satellite communication system as described in the opening paragraph which can dynamically modify the applied FEC scheme and in which there is no need for specifically adapted demodulators and decoders. This object is achieved in the satellite communication system according to the invention, which satellite communication system comprises a primary station, a communication satellite and at least one secondary station, the primary station transmitting data signals via the communication satellite to the secondary station, the primary station comprising a modulator for modulating the data signals onto at least two differently FEC-encoded frequency carriers, the secondary station comprising a tuner for tuning to one of the frequency carriers in dependence on a tuning signal received from the primary station, the secondary station further comprising signal quality determining means for determining at least an estimate of a signal quality of the frequency carrier presently tuned to, the secondary station comprising retuning request transmit means for transmitting a retuning request signal to the primary station when the estimate of the signal quality becomes lower than a predetermined threshold value, the primary station comprising determining means for determining a frequency carrier with a higher signal quality upon reception of the retuning request signal and tuning signal transmit means for transmitting the tuning signal indicating this frequency carrier to the secondary station. The data signals are modulated (e.g. QPSK-modulated) onto a number of differently FEC-encoded carriers. A secondary station that is tuned to one of the carriers determines (an estimate of) the signal quality, e.g. the signal to noise ratio or the bit error rate, of the received data signals (carrier). If this signal quality is lower/worse than a certain threshold value, the secondary station will send a retuning request to the primary station, indicating that it would like to tune to a different carrier with a more robust FEC scheme and a higher availability. The primary station will in response send a tuning signal indicating the different carrier to the secondary station and the secondary station will tune to the different carrier. In this way, the FEC scheme employed can be modified dynamically.

In an embodiment of the satellite communication system according to the invention the tuning signal is transmitted from the primary station via the communication satellite to the secondary station. In this way, the same infrastructure is used to transmit the tuning signal as is used for transmitting the data signals. The secondary station may comprise a separate tuner for receiving the tuning signal and other control signals. Alternatively, the tuning signal may be transmitted from the primary station to the secondary station in any other conceivable way, e.g. via a telephone line.

In another embodiment of the satellite communication system according to the invention the retuning request signal is transmitted from the secondary station via the communication satellite to the primary station. In this way, the return channel of the satellite communication system is used to transmit the retuning request signal. Alternatively, the retuning request signal may be transmitted from the secondary station to the primary station in any other conceivable way, via a telephone line.

BRIEF DESCRIPTION OF THE DRAWINGS

The above object and features of the present invention will be more apparent from the following description of the preferred embodiments with reference to the drawings, wherein.

DETAILED DESCRIPTION OF THE INVENTION

In the Figs, identical parts are provided with the same reference numbers.

Figure 1:
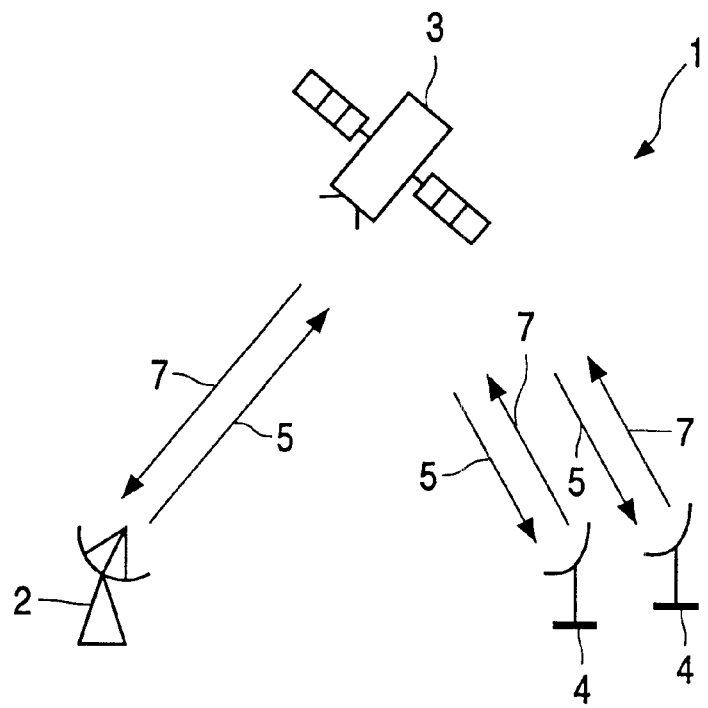
FIG. 1 shows a block diagram of an embodiment of a satellite communication system according to the invention.

FIG. 1 shows a block diagram of an embodiment of a satellite communication system 1 according to the invention. The satellite communication system 1 comprises a primary station 2, a satellite 3 and at least one secondary station 4. The primary station may be a ground station or a hub. The secondary station may be a satellite receiver, e.g. a VSAT satellite receiver. The satellite 3 may be a satellite supporting Ku- and/or Ka-band communications. The satellite communication system 1 may comprise further primary stations 2, satellites 3 and secondary stations 4. The primary station 2 can transmit data and control signals 5 via the communication satellite 3 to the secondary station 4. The secondary station 4 can transmit data and control signals 7 via the communication satellite 3 to the primary station 2. The primary station 2 can control the secondary station 4 via the control signals 5. The data signals 5 are modulated onto at least two differently FEC-encoded frequency carriers, i.e. a frequency carrier with a less robust FEC encoding and a frequency carrier with a more robust FEC encoding. The secondary station 4 is tuned to one of the frequency carriers. Under normal conditions, e.g. clear sky, the secondary station 4 is tuned to the frequency carrier with the less robust FEC encoding and having a relatively high data rate. The secondary station 4 continuously determines (an estimate of) the signal to noise ratio of this carrier and when this signal to noise ratio becomes lower than a certain threshold value (e.g. because of rain fading) the secondary station 4 transmits a retuning request signal via the control signals 7 to the primary station 2. Upon receipt of this retuning request signal the primary station 2 will transmit a tuning signal via the control signals 5 to the secondary station 4. This tuning signal indicates to the secondary station 4 that it has to tune to the other frequency carrier having the more robust FEC encoding. This will enable the secondary station 4 to receive the data signals 5 with an acceptable signal to noise ratio despite of the rain fading.

Figure 2:
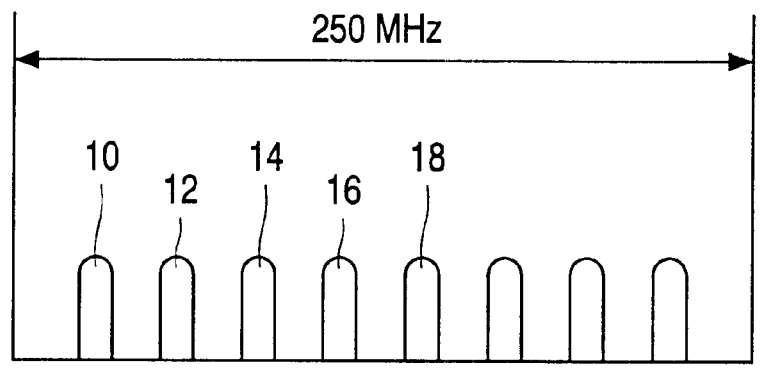
FIG. 2 shows a number of differently FEC-encoded carriers within a 250 MHz Ka-band transponder.

FIG. 2 shows a number of differently FEC-encoded carriers 10,12,14,16,18 within a 250 MHz Ka-band transponder. Some of the carriers 10 . . . 18 may have a same FEC encoding. The number of carriers shown in FIG. 2 is 8. The number of carriers may be smaller (a minimum of 2) or larger than 8. The bandwidth of the carriers is adapted accordingly. One or more of the carriers 10.18 may be used for transmission of control signals 5, while the other carriers are used for transmission of data signals 5. The carriers that are used for the transmission of control signals 5 may have a sufficient high transmit power or a sufficient robust FEC encoding so that their availability is sufficiently guaranteed.

Figure 3:
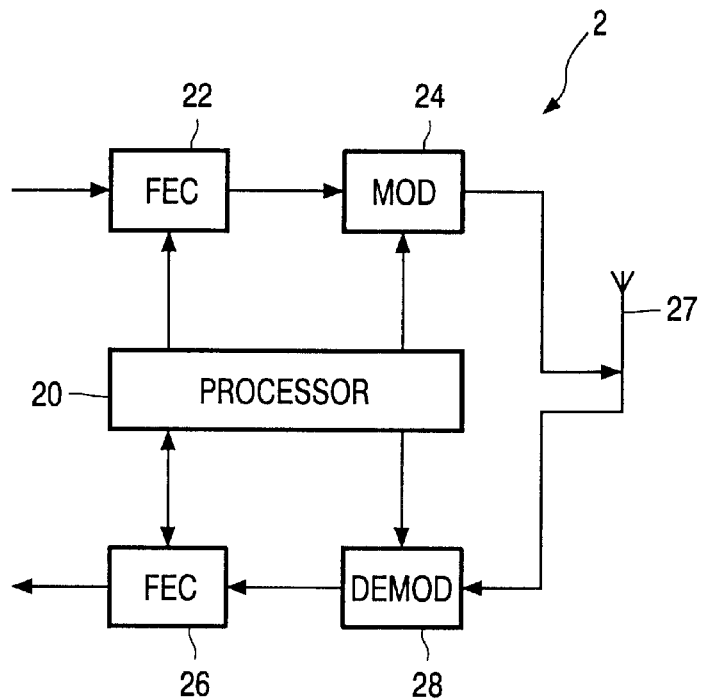
FIG. 3 shows a block diagram of an embodiment of a primary station according to the invention.

FIG. 3 shows a block diagram of an embodiment of (part of) a primary station 2 according to the invention. The primary station 2 comprises a FEC encoder 22 for encoding input data signals 5. An output of the FEC encoder 22 is coupled to an input of a modulator 24. The modulator 24 modulates the FEC encoded data signals 5 onto a frequency carrier and supplies them (via an upconverter and an amplifier which are not shown) to an antenna 27. The modulated encoded data signals 5 are transmitted by the antenna 27 to a communication satellite 3. The primary station 2 may comprise further FEC encoders 22 and modulators 24 for modulating the data signals onto a plurality of differently FEC encoded frequency carriers.

The primary station 2 can also receive modulated encoded data and control signals 7 via the antenna 27. These modulated encoded data and control signals 7 are supplied by the antenna 27 (via a tuner which is not shown) to a demodulator 28 for demodulation. The resulting encoded data and control signals 7 are supplied to a FEC decoder 26 for decoding. The resulting data signals 7 are supplied to an output, while the resulting control signals 7, e.g. the retuning request signal, are supplied to a processor 20.

The FEC encoder 22, the modulator 24, the FEC decoder 26 and the demodulator 28 are controlled by the processor 20, which may be a general purpose microprocessor or a microcontroller. The processor 20 can also supply the FEC-encoder 22 with control signals 5, e.g. the tuning signal. These control signals 5 are FEC-encoded by the FEC encoder 22 and the resulting encoded control signals 5 are modulated onto a frequency carrier by the modulator 24. The modulated encoded control signals 5 are supplied to and transmitted by the antenna 27.

When a retuning request signal is received from a secondary station 4 by the processor 20 in the primary station 2, the processor 20 determines a frequency carrier with a higher signal to noise ratio than the frequency carrier to which the secondary station 4 is presently tuned to. The determining means comprise the processor 20. Thereafter, a tuning signal indicating this newly determined frequency carrier is supplied by the processor 20 via the FEC encoder 22 and the modulator 24 to the antenna 27 for transmission to the secondary station 4. The tuning signal transmit means comprise the processor 20, the FEC encoder 22, the modulator 24 and the antenna 27.

Figure 4:
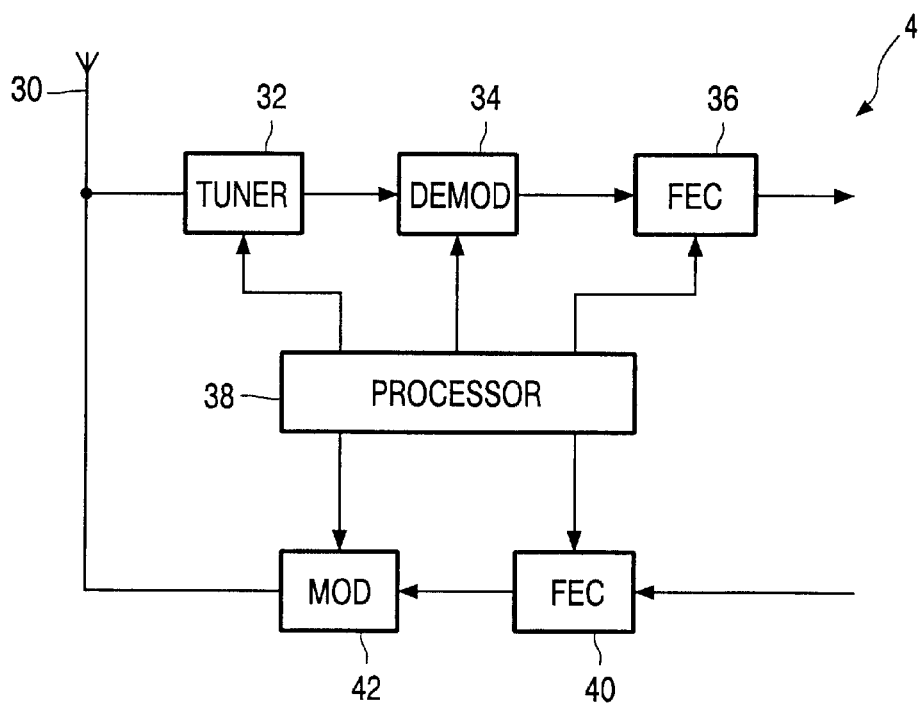
FIG. 4 shows a block diagram of an embodiment of a secondary station according to the invention.

FIG. 4 shows a block diagram of an embodiment of (part of) a secondary station 4 according to the invention. The secondary station 4 comprises an antenna 30 for receiving modulated and encoded data and control signals 5 from a communication satellite 3. The received data and control signals 5 are supplied by the antenna 30 to a tuner 32 which is tuned to one of the available frequency carriers and supplies the modulated and encoded data and control signals 5 which are carried by this frequency carrier to a demodulator 34 for demodulation. The demodulated data and control signals 5 are then supplied by the demodulator 34 to a FEC decoder 36 for decoding. The resulting demodulated and decoded data signals 5 are finally supplied to an output, while the resulting demodulated and decoded control signals 5 are supplied to a processor 38. The secondary station 4 may comprise further tuners 32, demodulators 34 and FEC decoders 36.

The secondary station 4 further comprises a FEC encoder 40 for encoding data signals 7 that are supplied to it via an input and control signals 7 that are supplied to the FEC encoder 40 by the processor 38. The encoded data and control signals 7 are supplied by the FEC encoder 40 to a modulator 42 for modulating. The modulated and encoded data and control signals 7 are then supplied (via an upconverter and an amplifier which are not shown) to the antenna 30 for transmission to the communication satellite 3.

The tuner 32, the demodulator 34, the FEC decoder 36, the FEC encoder 40 and the modulator 42 are controlled by the processor 38, which may again be a general purpose microprocessor or a microcontroller. The demodulator 34 and the FEC decoder may be comprised in the TDA8043 Satellite Demodulator and Decoder integrated circuit of Philips Semiconductors. This integrated circuit also comprises a signal to noise ratio estimator (signal quality determining means) for determining an estimate of the signal to noise ratio of the frequency carrier presently tuned to. This estimate is supplied to the processor 38 and the processor 38 determines whether this estimate is too low (i.e. lies below a certain predetermined threshold value). If this is indeed the case, the processor 38 supplies a retuning request signal (as part of the control signals 7) via the FEC encoder 40 and the modulator 42 to the antenna 30 for transmission to the communication satellite 3. The retuning request transmit means comprise the processor 38, the FEC encoder 40, the modulator 42 and the antenna 30.

The control signals 5 may comprise a tuning signal indicating that the secondary station should tune to another frequency carrier. Upon receiving such a tuning signal the processor 38 will instruct the tuner 32 to tune to the indicated frequency carrier.

In order to be able to transmit at a higher data rate the secondary station 4 may automatically retune to a higher data rate carrier (after a certain time has elapsed) or transmit an appropriate retuning request signal to the primary station 2 (after a certain time has elapsed). The primary station 2 may also send an appropriate tuning signal to the secondary station 4 (after a certain time has elapsed) without a prior request from the secondary station 4.

The control signals 5 and 7 may also be transmitted via another communication satellite or in another frequency band (Ka- or Ku-band) or within another transponder.

Alternatively, in stead of using a plurality of carriers with different FEC encoding schemes a plurality of carriers with different transmit powers may be used. When a secondary station is tuned to a carrier with a relatively low transmit power and a signal quality of that carrier becomes too low (e.g. because of rain fading) the secondary station may retune to another carrier with a higher transmit power (and thus avoid the problems of rain fading).

The scope of the invention is not limited to the embodiments explicitly disclosed. The invention is embodied in each new characteristic and each combination of characteristics. Any reference signs do not limit the scope of the claims. The word "comprising" does not exclude the presence of other elements or steps than those listed in a claim. Use of the word "a" or "an" preceding an element does not exclude the presence of a plurality of such elements.

What is claimed is:

1. A satellite communication system (1) comprising a primary station (2), a communication satellite (3) and at least one secondary station (4), the primary station (2) transmitting data signals (5) via the communication satellite (3) to the secondary station (4), the primary station (2) comprising a modulator (24) for modulating the data signals (5) onto at least two differently FEC-encoded frequency carriers, the secondary station (4) comprising a tuner (32) for tuning to one of the frequency carriers in dependence on a tuning signal received from the primary station (2), the secondary station (4) further comprising signal quality determining means for determining at least an estimate of a signal quality of the frequency carrier presently tuned to, the secondary station (4) comprising retuning request transmit means for transmitting a retuning request signal to the primary station (2) when the estimate of the signal quality becomes lower than a predetermined threshold value, the primary station (2) comprising determining means for determining a frequency carrier with a higher signal quality upon reception of the retuning request signal and tuning signal transmit means for transmitting the tuning signal indicating this frequency carrier to the secondary station (4).

2. The satellite communication system (1) according to claim 1, wherein the tuning signal is transmitted from the primary station (2) via the communication satellite (3) to the secondary station (4).

3. The satellite communication system (1) according to claim 1, wherein the retuning request signal is transmitted from the secondary station (4) via the communication satellite (3) to the primary station (2).

4. A primary station (2) for use in a satellite communication system (1), the primary station (2) transmitting data signals (5) via a communication satellite (3) to a secondary station (4), the primary station (2) comprising a modulator (24) for modulating the data signals (5) onto at least two differently FEC-encoded frequency carriers, the primary station (2) comprising receiving means for receiving a retuning request signal from the secondary station (4), the primary station (2) further comprising determining means for determining a frequency carrier with a requested signal quality upon reception of the retuning request signal and tuning signal transmit means for transmitting the tuning signal indicating this frequency carrier to the secondary station (4).

5. The primary station (2) according to claim 4, wherein the tuning signal is transmitted via the communication satellite (3).

6. The primary station (2) according to claim 4, wherein the retuning request signal is received via the communication satellite (3).

7. A secondary station (4) for use in a satellite communication system (1), the secondary station (4) comprising receive means for receiving data signals (5) via a communication satellite (3) from a primary station (2), the data signals (5) being modulated onto at least two differently FEC-encoded frequency carriers, the secondary station (4) comprising a tuner (32) for tuning to one of the frequency carriers in dependence on a tuning signal received from the primary station (2), the secondary station (4) further comprising signal quality determining means for determining at least an estimate of a signal quality of the frequency carrier presently tuned to, the secondary station (4) comprising retuning request transmit means for transmitting a retuning request signal to the primary station (2) when the estimate of the signal quality becomes lower than a predetermined threshold value.

8. The secondary station (4) according to claim 7, wherein the tuning signal is received via the communication satellite (3).

9. The secondary station (4) according to claim 7, wherein the retuning request signal is transmitted via the communication satellite (3).

10. A method of transmitting data signals (5) from a primary station (2) via a communication satellite (3) to a secondary station (4), the method comprising:

the primary station (2) modulating the data signals (5) onto at least two differently FEC-encoded frequency carriers, the secondary station (4) tuning to one of the frequency carriers in dependence on a tuning signal received from the primary station (2), the secondary station (4) determining at least an estimate of a signal quality of the frequency carrier presently tuned to, the secondary station (4) transmitting a retuning request signal to the primary station (2) when the estimate of the signal quality becomes lower than a predetermined threshold value, the primary station (2) determining a frequency carrier with a higher signal quality upon reception of the retuning request signal the primary station (2) transmitting the tuning signal indicating this frequency carrier to the secondary station (4).

11. The method according to claim 10, wherein the tuning signal is transmitted from the primary station (2) via the communication satellite (3) to the secondary station (4).

12. The method according to claim 10, wherein the retuning request signal is transmitted from the secondary station (4) via the communication satellite (3) to the primary station (4).

* * * * *